June 26, 1962
E. A. FIELD
3,040,734
SMOKE AND DRAFT CONTROL SYSTEM FOR A FURNACE
Filed Jan. 28, 1957
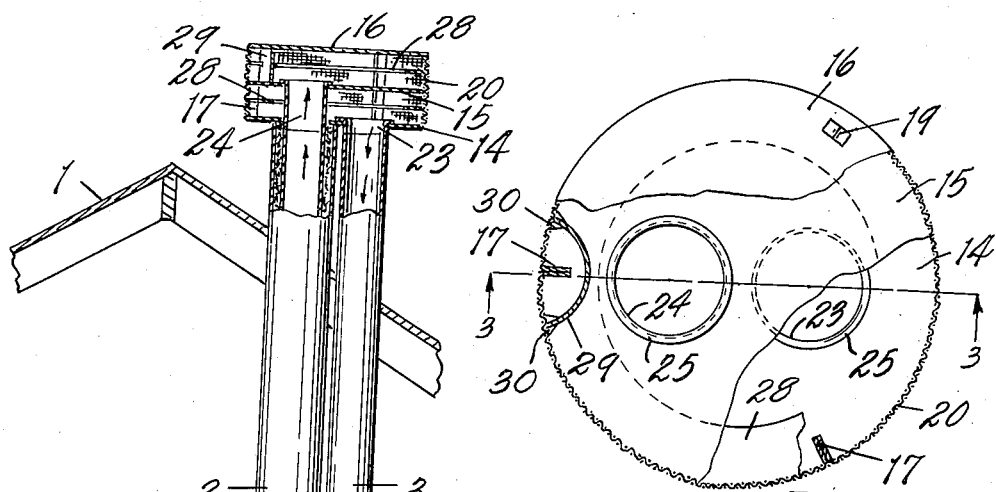
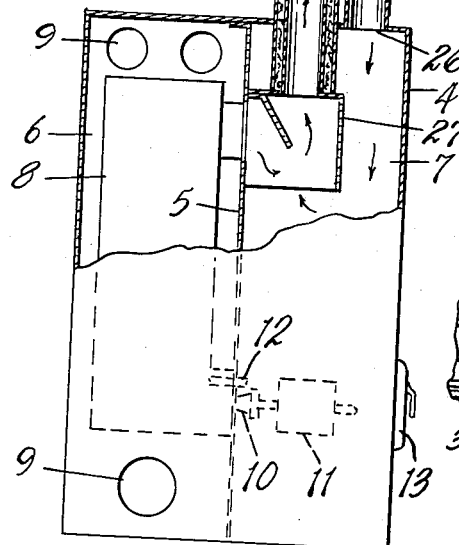
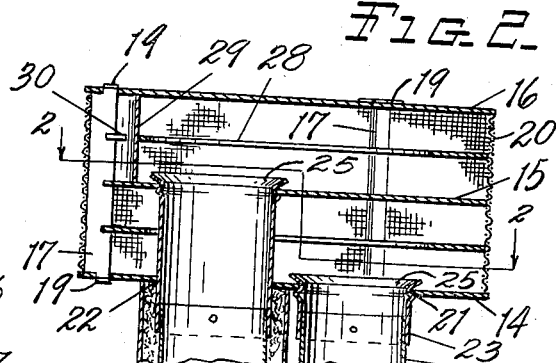
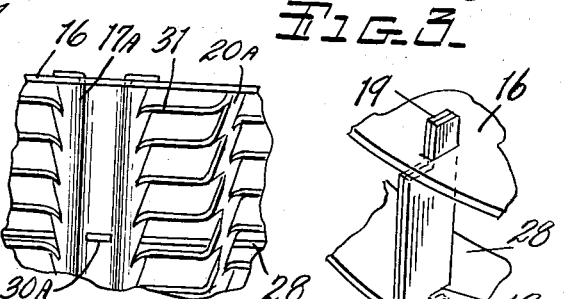
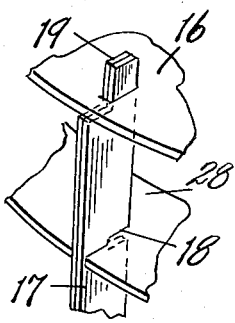
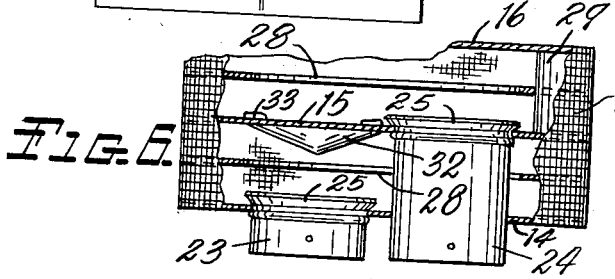
INVENTOR.
Edward A. Field
BY
Otto A. Earl
Attorney

United States Patent Office 3,040,734
Patented June 26, 1962

3,040,734
SMOKE AND DRAFT CONTROL SYSTEM
FOR A FURNACE
Edward A. Field, Mendota, Ill.; Amy Field and City National Bank and Trust Company of Chicago, executors of the will of said Edward Arthur Field, deceased
Filed Jan. 28, 1957, Ser. No. 636,737
19 Claims. (Cl. 126—307)

This invention relates to improvements in smoke and draft control system for a furnace. This application constitutes a continuation in part of my copending application, Serial Number 559,839, filed January 18, 1956 for Draft And Smoke Control System For A Furnace now Patent No. 2,818,060.

The principal objects of this invention are:

First, to provide a sealed furnace system utilizing separate flue pipes for introducing combustion air and exhausting smoke at a point exterior to a building.

Second, to provide a baffle or cap structure for substantially eliminating pressure differentials at the exterior ends of adjacent smoke and air flues due to atmospheric air currents or winds.

Third, to provide baffle structure that permits the use of economically sized cylindrical flues for the air inlet and smoke outlet of a closed furnace system.

Fourth, to provide baffle structure that will separate the smoke discharged from a smoke flue from the air entering an adjacent air inlet and cause wind currents directed against the structure to have substantially the same effect on the open ends of the flues.

Other objects and advantages of the invention will be apparent from the following description and claims. The drawings, of which there is one sheet, illustrate a highly practical form of the system and three variations of the pressure equalizing baffle structure used therein.

FIG. 1 is a conventional view partially in vertical section illustrating the main elements of the system as installed in a building.

FIG. 2 is a top plan view of the wind deflecting baffle structure shown in FIG. 1, the view being partially broken away in section on the broken line 2—2 in FIG. 3.

FIG. 3 is a fragmentary vertical cross sectional view taken along the line 3—3 in FIG. 2.

FIG. 4 is a fragmentary perspective view of the baffle structure with the screen removed to show details of the assembly connections of the structure.

FIG. 5 is a fragmentary view similar to FIG. 4 but showing a modified form of the baffle structure.

FIG. 6 is a fragmentary vertical cross sectional view through a further modified form of the baffle structure.

The above mentioned copending application discloses a furnace and flue system for delivering air to the furnace and exhausting smoke from the furnace exteriorly of the building in which the furnace is located along with baffle structure for equalizing wind pressures at the outer ends of the smoke and air flues. The present invention embodies the same general type of draft and smoke system except that separate spaced smoke and air flues are used in place of the concentric telescoped flues of the prior application. The external baffle structure also differs somewhat to coact with the spaced flues. It is pointed out that spaced separate flues are more desirable in some respects in that a full circular cross section for the air flue is more efficient for the transmission of a given quantity of air than an annular flue. Also all joints are fully exposed and easier to connect and inspect if separate flues are used and two separate flues are usually less expensive than a telescoped tube double flue.

As is shown generally in FIG. 1 a building 1 to be heated has a separate smoke flue 2 and air flue 3 extending through the roof thereof. The smoke flue may be of double walled insulated construction and both flues may be made up of sections, not illustrated. It is not essential that the flues maintain their parallel closely spaced relation within the building. The flues extend to a furnace casing 4 located within the building. The casing is divided by a partition 5 into a heat exchange chamber 6 and an air chamber 7. A fire pot or combustion chamber 8 is located in the heat exchange chamber to heat air entering and leaving the heat exchange chamber through the ports 9 as will be understood.

A burner 10 and suitable controls 11 therefor is positioned in the air chamber to deliver fuel and combustion air into the combustion chamber. A passage 12 for secondary combustion air to enter the combustion chamber may also be provided depending on the type of the burner. The drawing conventionally illustrates a gas burner but oil burners or a solid fuel system may be substituted therefor. A door 13 in the casing 4 permits access to the burner for service or for firing solid fuel but is normally closed and substantially sealed during operation of the furnace.

The lower end of the air inlet flue 3 opens directly into the air chamber 7 as at 26 while the lower end of the smoke flue opens into a smoke box 27 connected to the combustion chamber 8. The smoke box may open at the bottom into the air chamber 7. The pressure differential created by the heated products of combustion, more generally defined as smoke herein, thus draws outside air into the air chamber 7 where it supplies the demand of the burner without being affected by the pressure of the air in the building and without consuming the oxygen in the building. The furnace is thus well adapted for installation in confined spaces.

The baffle structure mounted on the tops of the flues 2 and 3 consists of a lower plate 14, intermediate plate 15 and top plate 16. The plates are circular although this is not critical and are substantially larger than the combined diameters or widths of the two flues 2 and 3. Angularly spaced and radially disposed upright struts 17 of folded sheet metal are notched as at 18 to engage the edge of the intermediate plate 15. The ends of the struts have tabs 19 passed through slits in the upper and lower plates and bent laterally to retain the plates in spaced relation. A wire screen 20 wrapped around the struts prevents birds from nesting between the plates.

The bottom plate 14 has two adjacent holes 21 and 22 formed therethrough. A short sleeve 23 has its upper end secured in the hole 21 by having its walls upset or rolled on opposite sides of the edge of the hole. The lower end of the sleeve forms a connection to the upper end of the air inlet flue 3. A tube 24 projects through the other hole 22 and has its upper end secured in a hole provided therefor in the intermediate plate 15. The lower end of the tube 24 forms a connection to the smoke flue 2. The upper ends of the sleeve 23 and tube 24 are extended in low lips 25 to prevent water collecting on the plates 14 and 15 from draining into the tubes.

The structure thus far described includes the essential elements of the system. Combustion air enters between the plates 14 and 15 and is conducted through the flue 3 to the furnace. Smoke is discharged by the flue 2 between the plates 15 and 16 and escapes by rising around the edge of the plate 16. The annular openings between the plates 14, 15 and 16 are closely adjacent in the same area subject to the same external atmospheric pressure so no external or variable pressure is applied to the flues to affect the operation of the burner. The baffle plates direct external wind currents from any direction in generally parallel paths across the open ends of the flues 2 and 3 so that no differential effect is created by external conditions.

In order to further refine the action of the baffle plates 14, 15 and 16 flat annular deflector rings 28 are supported in spaced relation between the plates by engagement with the struts 17. The rings assist in flattening air currents that may be directed at a vertical angle against the baffle structure.

Since the space between the lower plate 14 and the intermediate plate 15 is partially obstructed by the tube 24 and this obstruction may have some variable effect on air flow between the plates when the wind blows from different directions, a compensating or equalizing obstruction is placed between the intermediate plate 15 and upper plate 16. This takes the form of a convex baffle 29 arranged as an upright segment of a cylinder of the same diameter as the tube 24. The baffle 29 is positioned toward the outer edge of the plates to bear the same relation to the open end of the smoke flue that the side of the tube 24 bears toward the open end of the air inlet flue. The baffle 29 and the upper ring 28 have coacting slots at 30 to hold the baffle 29 in place.

The modified form of baffle structures shown in FIG. 5 substitutes a cylinder of expanded metal 20A for the screen 20 of FIGS. 1 to 3. The expanded metal has integral imperforate struts 17A that take the place of the struts 17 and the fins or grids 31 that are slit and bent from the original sheet of the expanded metal define openings for the flow of air and gases through the baffle structure. The expanded metal grid has the ability of partially obstructing and slowing down air flow which is sometimes of advantage, particularly in high winds. The flat character of the fins 31 assists in flattening out the air flow through the baffle. The concavo-convex struts 17A are slit as at 30A to receive and support the edges of the deflector rings 28. In other respects the modified baffle structure has the same properties as the first form of baffle structure.

The modified baffle structure shown in FIG. 6 is the same as the first form of the structure except that an inverted conical baffle 32 has been secured to the underside of the intermediate plate 15 directly over the air inlet flue 23. Tabs 33 on the base of the conical baffle are passed through the plate and bent over to hold the cone in place. The cone functions to deflect air downwardly into the inlet flue and thus creates a small positive pressure in the inlet as compared to the pressure surrounding smoke flue outlet. While the baffle structure in FIG. 6 is designed to create a pressure differential rather than to eliminate it at the ends of the flues the differential is constant and does not depend on or change with the direction from which the wind is blowing.

Having thus described in the invention what I claim as new and desire to secure by Letters Patent is:

1. A furnace and smoke flue installation in a building comprising a combustion chamber, a burner arranged to deliver fuel and combusion air into said chamber, walls forming a heat exchange area around said chamber, walls forming an enclosure for the delivery of primary and secondary combustion air to said burner and separated from the atmosphere in said building, a smoke flue connected to said chamber and extending exteriorly of said building, an inlet flue connected to said enclosure and extending exteriorly of said building, the exteriorly extending portions of said flues being cylindrical and arranged in sid by side relation with the smoke flue projecting above the inlet flue, a lower baffle plate having holes therein passing said flues with the inlet flue terminating just above the plate, an intermediate baffle plate spaced above the first plate with the upper end of said smoke flue terminating slightly above the intermediate plate, a top plate spaced above the intermediate plate, struts holding said plates in spaced relation, a cylindrical screen obstructing access to between said plates, annular deflector rings arranged in flat spaced relation between each pair of said plates, and a baffle arranged between the outer edges of the upper two of said plates and shaped as the arc of a cylinder in the same relation to the upper end of said smoke flue as the side of the smoke flue to the upper end of said inlet flue, said plates and said rings being approximately coextensive in outline.

2. A furnace and smoke flue installation in a building comprising a combustion chamber, a burner arranged to deliver fuel and combustion air into said chamber, walls forming an enclosure for the delivery of combustion air to said burner and separated from the atmosphere in said building, a smoke flue connected to said chamber and extending exteriorly of said building, an inlet flue connected to said enclosure and extending exteriorly of said building, the exteriorly extending portions of said flues being cylindrical and arranged in side by side relation with the smoke flue projecting above the inlet flue, a lower baffle plate having holes therein passing said flues with the inlet flue terminating just above the plate, an intermediate baffle plate spaced above the first plate with the upper end of said smoke flue terminating slightly above the intermediate plate, a top plate spaced above the intermediate plate, struts holding said plates in spaced relation, annular deflector rings arranged in flat spaced relation between each pair of said plates, and a baffle arranged between the outer edges of the upper two of said plates and shaped as the arc of a cylinder in the same relation to the upper end of said smoke flue as the side of the smoke flue to the upper end of said inlet flue, said plates and said rings being approximately coextensive in outline.

3. A furnace and smoke flue installation in a building comprising a combustion chamber, a burner arranged to deliver fuel into said chamber, walls forming a heat exchange area around said chamber, walls forming an enclosure for the delivery of combustion air to said chamber and separated from the atmosphere in said building, a smoke flue connected to said chamber and extending exteriorly of said building, an inlet flue connected to said enclosure and extending exteriorly of said building, the exteriorly extending portions of said flues being arranged in side by side relation with the smoke flue projecting above the inlet flue, a lower baffle plate having holes therein passing said flues with the inlet flue opening above the plate, an intermediate baffle plate spaced above the first plate with the upper end of said smoke flue opening above the intermediate plate, a top plate spaced above the intermediate plate, means holding said plates in spaced relation and obstructing access of large objects to between said plates, annular deflector rings arranged in flat spaced relation between each pair of said plates, and a baffle arranged between the outer edges of the upper two of said plates and shaped as the arc of a cylinder in the same relation to the upper end of said smoke flue as the side of the smoke flue to the upper end of said inlet flue, said plates and said rings being approximately coextensive in outline.

4. A furance and smoke flue installation comprising a combustion chamber, a burner arranged to deliver fuel into said chamber, walls forming an enclosure for the delivery of combustion air to said chamber and separated from the atmosphere therearound, a smoke flue connected to said chamber and extending exteriorly therefrom, an inlet flue connected to said enclosure and extending exteriorly therefrom, the exteriorly extending portions of said flues being arranged in side by side relation with the smoke flue projecting above the inlet flue, a lower baffle plate having holes therein passing said flues with the inlet flue opening above the plate, an intermediate baffle plate spaced above the first plate with the upper end of said smoke flue opening above the intermediate plate, a top plate spaced above the intermediate plate, means holding said plates in spaced relation and obstructing access of large objects to between said plates, and a baffle arranged between the outer edges of the upper two of said plates in the same relation to the upper end of said smoke flue as the side of the smoke flue to the upper end of said inlet flue, said plates being approximately coextensive in outline.

5. A furnace and smoke flue installation in a building comprising a combustion chamber having a fuel opening and an air opening arranged to deliver fuel and combustion air into said chamber, walls forming a heat exchange area around said chamber, walls forming an enclosure for delivery of combustion air to said air opening and separated from the atmosphere in said building, a smoke flue connected to said chamber and extending exteriorly of said building, an inlet flue connected to said enclosure and extending exteriorly of said building, the exteriorly extending portions of said flues being cylindrical and arranged in side by side relation with the smoke flue projecting above the inlet flue, a lower baffle plate having holes therein passing said flues with the inlet flue opening above the plate, an intermediate baffle plate spaced above the first plate with the upper end of said smoke flue opening above the intermediate plate, a top plate spaced above the intermediate plate, a cylinder of expanded metal holding said plates in spaced relation, and obstructing access of large objects to between said plates, annular deflector rings arranged in flat spaced relation between each pair of said plates, and a baffle arranged between the outer edges of the upper two of said plates and shaped as the arc of a cylinder in the same relation to the upper end of said smoke flue as the side of the smoke flue to the upper end of said inlet flue, said plates and said rings being approximately coextensive in outline.

6. A furnace and smoke flue installation in a building comprising a combustion chamber, a burner arranged to deliver fuel into said chamber, walls forming an enclosure for the delivery of combustion air to said chamber and separated from the atmosphere in said building, a smoke flue connected to said chamber and extending exteriorly of said building, an inlet flue connected to said enclosure and extending exteriorly of said building, the exteriorly extending portions of said flues being cylindrical and arranged in side by side relation with the smoke flue projecting above the inlet flue, a lower baffle plate having holes therein passing said flues with the inlet flue opening above the plate, an intermediate baffle plate spaced above the first plate with the upper end of said smoke flue opening above the intermediate plate, a top plate spaced above the intermediate plate, means holding said plates in spaced relation, annular deflector rings arranged in flat spaced relation between each pair of said plates, and a baffle arranged between the outer edges of the upper two of said plates in the same relation to the upper end of said smoke flue as the side of the smoke flue to the upper end of said inlet flue, said plates and said rings being approximately coextensive in outline.

7. A furnace and smoke flue installation comprising a combustion chamber, a burner arranged to deliver fuel into said chamber, walls forming an enclosure for the delivery of combustion air to said chamber and separated from the atmosphere therearound, a smoke flue connected to said chamber and extending exteriorly therefrom, an inlet flue connected to said enclosure and extending exteriorly therefrom, exteriorly extending portions of said flues being arranged in side by side relation with one flue projecting above the other flue, a lower baffle plate having holes therein passing said flues with said other flue opening above the plate, an intermediate baffle plate spaced above the first plate with the upper end of said one flue opening above the intermediate plate, a top plate spaced above the intermediate plate, means holding said plates in spaced relation, and a baffle arranged between the outer edges of the upper two of said plates in the same relation to the upper end of said one flue as the side of the one flue to the upepr end of said other flue.

8. A furnace and smoke flue installation in a building comprising a combustion chamber, a burner arranged to deliver fuel into said chamber, walls forming an enclosure for the delivery of combustion air to said chamber and separated from the atmosphere in said building, a smoke flue connected to said chamber and extending exteriorly of said building, an inlet flue connected to said enclosure and extending exteriorly of said building, the exteriorly extending portion of said flues being arranged in side by side relation with one flue projecting above the other flue, a lower baffle plate having holes therein passing said flues with the other flue opening above the plate, an intermediate baffle plate spaced above the first plate with the upper end of said one flue opening above the intermediate plate, a top plate spaced above the intermediate plate, means holding said plates in spaced relation, and an inverted conical baffle secured to the underside of said intermediate plate over said other flue.

9. A pressure equalizing cap for the tops of a smoke flue and an air inlet flue arranged adjacent thereto comprising vertically spaced top, bottom and intermediate plates of circular shape, means including struts and a screen holding said plates apart and preventing access of birds therebetween while permitting flow of air therebetween, the bottom plate defining two equal circular holes spaced from each other and equally from the edge of the plate and along a diameter of the plate, a sleeve mounted in one of said holes and projecting below said bottom plate to form a connection to an air inlet flue, the upper edge of said sleeve extending in a raised lip above said bottom plate to exclude water collected on the plate, a tube extending through the other of said holes and extending below said bottom plate to form a connection to a smoke flue, the upper end of said tube opening through a hole provided therefor in said intermediate plate and projecting in a raised lip thereabove to exclude water collecting on the plate, flat annular baffle rings arranged in spaced relation between said top, bottom and intermediate plates with the inner edges of the rings spaced outwardly from the open ends of said tube and said sleeve, and a convex baffle arranged vertically between said top and intermediate plate in a corresponding relation to the open end of said tube as the tube to the end of said sleeve.

10. A pressure equalizing cap for the tops of a smoke flue and an air inlet flue arranged adjacent thereto comprising vertically spaced top, bottom and intermediate plates, means holding said plates apart and preventing access of birds therebetween while permitting flow of air therebetween, the bottom plate defining two equal circular holes spaced from each other and equally from the edge of the plate and along a diameter of the plate, a sleeve mounted in one of said holes and projecting below said bottom plate to form a connection to an air inlet flue, a tube extending through the other of said holes and extending below said bottom plate to form a connection to a smoke flue, the upper end of said tube opening through a hole provided therefor in said intermediate plate, flat annular baffle rings arranged in spaced relation between said top, bottom and intermediate plates with the inner edges of the rings spaced outwardly from the open ends of said tube and said sleeve, and a convex baffle arranged vertically between said top and intermediate plate in a corresponding relation to the open end of said tube that the side of said tube bears to the open end of said sleeve.

11. A pressure equalizing cap for the tops of a smoke flue and an air inlet flue arranged adjacent thereto comprising vertically spaced top, bottom and intermediate plates of circular shape, means including a cylinder of expanded sheet metal holding said plates apart and preventing access of birds therebetween while permitting flow of air therebetween, the bottom plate defining two circular holes spaced from each other and equally from the edge of the plate and along a diameter of the plate, a sleeve mounted in one of said holes and projecting below said bottom plate to form a connection to an air inlet flue, the upper edge of said sleeve extending in a raised lip above said bottom plate to exclude water collected on the plate, a tube extending through the other of said holes and extending below said bottom plate to form a connection to a smoke flue, the upper end of said tube opening through a hole provided therefor in said intermediate plate and projecting in a raised lip thereabove to exclude water collecting on the plate, flat annular baffle rings arranged in spaced relation between said top, bottom and intermediate plates with the inner edges of the rings spaced outwardly from the open ends of said tube and said sleeve, and a convex baffle arranged vertically between said top and intermediate plate in corresponding relation to the open end of said tube as the tube to the end of said sleeve.

12. A pressure equalizing cap for the tops of a smoke flue and an air inlet flue arranged adjacent thereto comprising vertically spaced top, bottom and intermediate plates of circular shape, means including a cylinder of expanded sheet metal holding said plates apart and preventing access of birds therebetween while permitting flow of air therebetween, the bottom plate defining two holes spaced from each other, a sleeve mounted in one of said holes and projecting below said bottom plate to form a connection to one flue, a tube extending through the other of said holes and extending below said bottom plate to form a connection to the other flue, the upper end of said tube opening through a hole provided therefore in said intermediate plate, and flat annular baffle rings arranged in spaced relation between said top, bottom and intermediate plates with the inner edges of the rings spaced outwardly from the open ends of said tube and said sleeve.

13. A pressure equalizing cap for the tops of a smoke flue and an air inlet flue arranged adjacent thereto comprising vertically spaced top, bottom and intermediate plates, means holding said plates apart and permitting flow of air therebetween, the bottom plate defining two equal holes spaced from each other and from the edge of the palte, a sleeve mounted in one of said holes and projecting below said bottom plate to form a connection to an air inlet flue, a tube extending through the other of said holes and extending below said bottom plate to form a connection to a smoke flue, the upper end of said tube opening through a hole provided therefor in said intermediate plate, flat annular baffle rings arranged in spaced relation between said top, bottom and intermediate plates with the inner edges of the rings spaced outwardly from the open ends of said tube and said sleeve, and a baffle arranged vertically between said top and intermediate plate in a corresponding relation to the open end of said tube that the side of said tube bears to the open end of said sleeve.

14. A pressure equalizing cap for the tops of a smoke flue and an air inlet flue arranged adjacent thereto comprising vertically spaced top, bottom and intermediate plates, means holding said plates apart and permitting flow of air therebetween, the bottom plate defining two holes, a sleeve mounted in one of said holes and projecting below said bottom plate to form a connection to one flue, a tube extending through the other of said holes and extending below said bottom plate to form a connection to the other flue, the upper end of said tube opening through a hole provided therefor in said intermediate plate, and a baffle arranged vertically between said top and intermediate plate in a corresponding relation to the open end of said tube that the side of said tube bears to the open end of said sleeve.

15. A cap for the tops of a smoke flue and an air inlet flue arranged adjacent thereto comprising vertically spaced top, bottom and intermediate plates, means holding said plates apart and permitting flow of air therebetween, the bottom plate defining two holes spaced from the edge of the plate, a sleeve mounted in one of said holes and projecting below said bottom plate to form a connection to an air inlet flue, a tube connected to the bottom plate around the other of said holes to form a connection to a smoke flue, the upper end of said tube opening through a hole provided therefor in said intermediate plate, an inverted conical baffle secured to the bottom of said intermediate plate over the open end of said sleeve, and a baffle arranged vertically between said top and intermediate plate in a corresponding relation to the open end of said tube that the side of said tube bears to the open end of said sleeve.

16. A cap for the tops of a smoke flue and an air inlet flue arranged adjacent thereto comprising vertically spaced top, bottom and intermediate plates, means holding said plates apart and permitting flow of air therebetween, the bottom plate defining two holes, a sleeve mounted in one of said holes and projecting below said bottom plate to form a connection to one flue, a tube connected to the bottom plate around the other of said holes to form a connection to the other flue, the upper end of said tube opening through a hole provided therefor in said intermediate plate, and an inverted conical baffle secured to the bottom of said intermediate plate over the open end of said sleeve.

17. The combination with a smoke discharge flue, and an air inlet flue cooperative with the source of the smoke outlet flue, said flues being arranged in adjacent side-by-side relation to each other, of a cap cooperative with both of said flues and comprising vertically spaced top, bottom and intermediate plates fixedly supported in vertically spaced substantially parallel relation to each other and for free flow of air therebetween and peripherally opening to the surrounding atmosphere, the bottom plate having two flue openings therein disposed in side-by-side relation, the intermediate plate having a single opening therein vertically aligned with one of the flue openings of said bottom plate, one of said flues being disposed through said aligned openings in said bottom and intermediate plates and opening to the space between the intermediate and top plate, the other flue being disposed in the flue opening in said bottom plate and opening to the space between said bottom and intermediate plates.

18. The combination with a smoke discharge flue, and an air inlet flue cooperative with the source of the smoke outlet flue, said flues being arranged in adjacent side-by-side relation to each other, of a cap cooperative with both of said flues and comprising vertically spaced top, bottom and intermediate plates fixedly supported in vertically spaced substantially parallel relation to each other for free flow of air therebetween and peripherally opening to the surrounding atmosphere, the bottom and intermediate plates having vertically aligned flue openings therein in which one of said flues is disposed to discharge into the space between the top and intermediate plates, the bottom plate having a second opening therein in which the other flue is disposed to discharge into the space between the bottom plate and intermediate plate, the intermediate plate being imperforate except for the first flue opening therein.

19. A cap for the tops of a smoke discharge flue and an air inlet flue cooperative with the source of the smoke outlet flue and arranged in adjacent side-by-side relation to each other comprising vertically spaced top, bottom and intermediate plates fixedly supported in vertically spaced substantially parallel relation to each other for free flow of air therebetween and peripherally opening to the surrounding atmosphere, the bottom and intermediate plates having vertically aligned flue openings therein in which a tube is positioned to receive one of said flues to discharge into the space between the top and intermediate plates, the bottom plate having a second opening with a sleeve secured to receive the other flue to discharge into the space between the bottom plate and intermediate plate, the intermediate plate being imperforate except for the first flue opening therein.

(References on following page)

References Cited in the file of this patent

UNITED STATES PATENTS

| | | |
|---|---|---|
| 1,263,833 | Akerlund | Apr. 23, 1918 |
| 2,031,314 | Hunter | Feb. 18, 1936 |
| 2,647,477 | Martin | Aug. 4, 1953 |
| 2,713,301 | McKann | July 19, 1955 |
| 2,742,846 | Alward | Apr. 24, 1956 |
| 2,755,794 | Wendell | July 24, 1956 |
| 2,764,972 | Ryder | Oct. 2, 1956 |
| 2,818,060 | Field | Dec. 31, 1957 |

FOREIGN PATENTS

| | | |
|---|---|---|
| 423,724 | Great Britain | Feb. 6, 1935 |